US008117908B2

(12) United States Patent
Engler et al.

(10) Patent No.: US 8,117,908 B2
(45) Date of Patent: Feb. 21, 2012

(54) POSITION MEASURING DEVICE FOR A FLUIDIC CYLINDER

(75) Inventors: Alfred Engler, Sigmarszell (DE); Nejat Mahdavi, Lindau (DE); Christian Thuerigen, Leonberg (DE)

(73) Assignee: Liebherr-Elektronik GmbH, Lindau (DE)

( * ) Notice: Subject to any disclaimer, the term of this patent is extended or adjusted under 35 U.S.C. 154(b) by 181 days.

(21) Appl. No.: 12/512,882

(22) Filed: Jul. 30, 2009

(65) Prior Publication Data

US 2010/0089144 A1 Apr. 15, 2010

(30) Foreign Application Priority Data

Jul. 31, 2008 (DE) .................... 20 2008 010 230 U

(51) Int. Cl.
*G01M 19/00* (2006.01)
*G01B 3/30* (2006.01)
*G01B 21/00* (2006.01)
*G01P 21/00* (2006.01)
*G01L 27/00* (2006.01)

(52) U.S. Cl. ............................ 73/168; 73/1.79; 73/1.68

(58) Field of Classification Search ........................ None
See application file for complete search history.

(56) References Cited

U.S. PATENT DOCUMENTS

| | | | | |
|---|---|---|---|---|
| 3,928,796 | A * | 12/1975 | Kaiser | 324/725 |
| 3,948,359 | A * | 4/1976 | Rogers | 188/1.11 R |
| 4,577,509 | A | 3/1986 | Moser | |
| 4,587,850 | A * | 5/1986 | Moser | 73/658 |
| 4,788,489 | A * | 11/1988 | Kobayashi et al. | 324/660 |
| 4,949,573 | A * | 8/1990 | Wolfe et al. | 73/117.03 |
| 5,387,004 | A * | 2/1995 | Engel | 280/124.152 |
| 5,396,973 | A * | 3/1995 | Schwemmer et al. | 188/267.1 |
| 5,510,986 | A * | 4/1996 | Williams | 701/38 |
| 5,585,733 | A * | 12/1996 | Paglione | 324/678 |
| 5,901,633 | A * | 5/1999 | Chan et al. | 92/5 R |
| 7,548,075 | B2 * | 6/2009 | Somers | 324/688 |
| 2002/0177942 | A1 * | 11/2002 | Knaian et al. | 701/117 |
| 2005/0171673 | A1 * | 8/2005 | Miura | 701/70 |
| 2006/0087314 | A1 * | 4/2006 | Zhu et al. | 324/207.17 |
| 2007/0235272 | A1 | 10/2007 | Sieh et al. | |

FOREIGN PATENT DOCUMENTS

| | | |
|---|---|---|
| DE | 35 18 858 | 11/1985 |
| DE | 202 18 623 | 2/2003 |
| DE | 20 2007 001 420 | 7/2008 |

OTHER PUBLICATIONS

Author: Unknown, Title: No contact means no headaches in position transducing, Date: Aug. 17, 2000, Publisher: Machine Design, pp. 1-3. Web Site: http://machinedesign.com.*

German Patent and Trademark Office; German Search Report of German Utility Model App. No. 20 2008 010 230.8; Mar. 3, 2009; München, Germany.

* cited by examiner

*Primary Examiner* — Lisa Caputo
*Assistant Examiner* — Roger Hernandez-Prewitt
(74) *Attorney, Agent, or Firm* — Alleman Hall McCoy Russell & Tuttle LLP

(57) ABSTRACT

The present disclosure relates to a position measuring device for a fluidic cylinder, which includes a cylinder jacket and a piston rod longitudinally movable in the cylinder jacket, wherein the position measuring device includes an evaluation unit which determines the position of the piston rod with respect to the cylinder jacket with reference to the intrinsic capacitance of the capacitor formed by cylinder jacket, piston rod and a dielectric fluid acting as a dielectric.

20 Claims, 5 Drawing Sheets

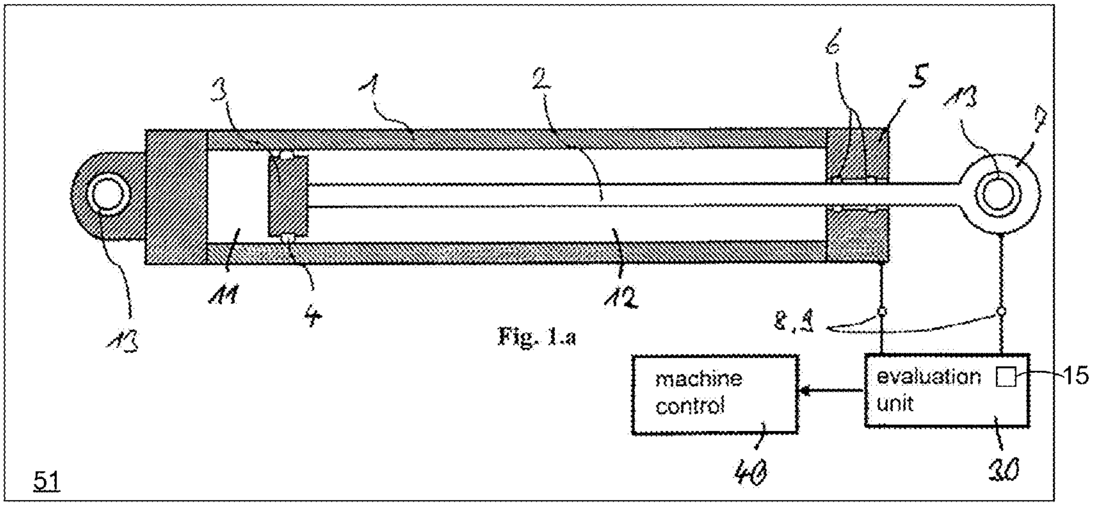
Fig. 1.a
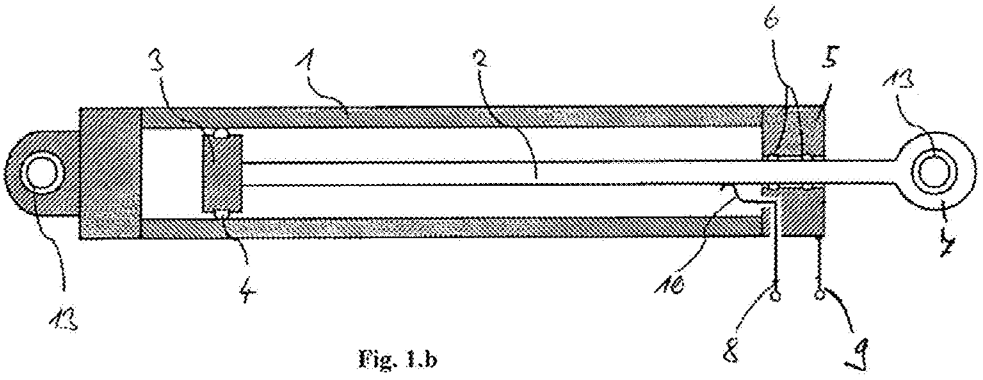
Fig. 1.b
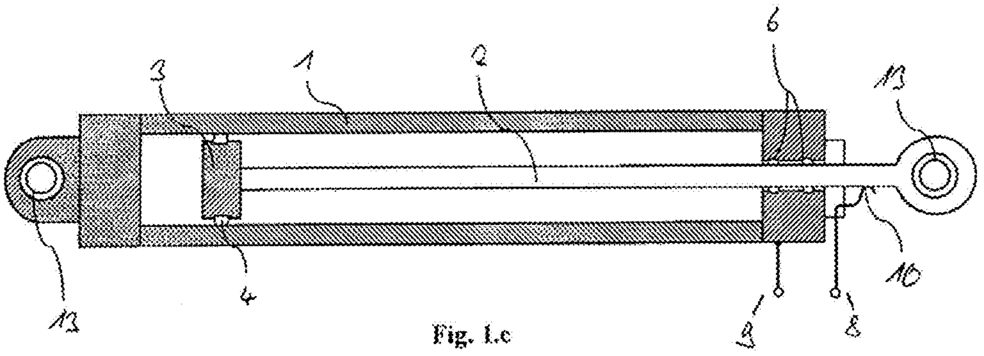
Fig. 1.c

POSITION MEASURING DEVICE FOR A FLUIDIC CYLINDER

CROSS REFERENCE TO RELATED APPLICATION

This application claims priority to German Utility Model Application No. 20 2008 010 230.8, filed Jul. 31, 2008, which is hereby incorporated by reference in its entirety for all purposes.

TECHNICAL FIELD

The present disclosure relates to a position measuring device for a fluidic cylinder, in particular a hydraulic or pneumatic cylinder, which includes a cylinder jacket and a piston rod longitudinally movable in the cylinder jacket.

BACKGROUND AND SUMMARY

Such position measuring devices for measuring the linear expansion of fluidic cylinders are used in a multitude of technical fields whenever information on the linear expansion of the fluidic cylinder is required for precise positioning. In particular, such position measuring devices are used for determining the linear expansion of the fluidic cylinders of construction machines, so that e.g. in excavators, wheel loaders or cranes, the shovel or fork can be positioned precisely. For this purpose the linear expansions of all fluidic cylinders involved must be measured, so as to be able to calculate the end position of the shovel or fork with reference to the linear expansion measured and by means of suitable transformations.

To effect a linear expansion of the cylinder, fluidic cylinders are supplied with a pressurized fluid, in particular with hydraulic oil or compressed air, whereby the piston rod is moved with respect to the cylinder. For measuring the linear expansion of fluidic cylinders, magnetostriction-based measuring systems are already known. A measuring element with corresponding magnetic properties is integrated in the piston rod, for which purpose the same must be bored up axially. This is very costly especially in very long cylinders of up to six meters and requires much effort in terms of the deep boring technique. In addition, the cabling for the measuring electronics is arranged inside the cylinders and hence in the high-pressure zone with up to 400 bar.

From DE 202 18 623 U1, a position measuring device for fluidic cylinders furthermore is known, in which an electrically insulated metal bar immersed in the piston rod and the piston rod itself form a capacitor, whose capacitance is measured. Mounting the measuring probe in the piston rod in turn is very costly and requires much effort in terms of the deep boring technique. In addition, difficulties again exist as regards the cabling inside the cylinders, since the same again extends in the high-pressure zone.

Therefore, it is the object of the present disclosure to provide a position measuring device for fluidic cylinders, which offers sufficient accuracy when measuring the length of a hydraulic cylinder at low cost and with little constructive effort.

This object is solved by a position measuring device for a fluidic cylinder wherein the fluidic cylinder includes a cylinder jacket and a piston rod longitudinally movable in the cylinder jacket. In particular, the cylinder is a hydraulic cylinder or a pneumatic cylinder. In accordance with the present disclosure, the position measuring device includes an evaluation unit, which determines the position of the piston rod with respect to the cylinder jacket with reference to the intrinsic capacitance of the capacitor formed by cylinder jacket, piston rod and a dielectric fluid acting as a dielectric. The piston rod and cylinder jacket represent the electrodes of the capacitor, whereas the fluid supplied to the cylinder is a dielectric fluid and acts as a dielectric. By using the intrinsic capacitance of the capacitor formed by the cylinder jacket, piston rod and dielectric, the use of additional measuring probes, as they were absolutely necessary in the prior art, can be omitted. In this way, an extremely inexpensive and easily realized position measuring device is provided, which nevertheless provides for a length measurement of the fluidic cylinder with sufficient accuracy. Furthermore, the present disclosure provides for a mechanically stable and vibration- and shock-resistant measuring device.

The measuring method proposed utilizes the intrinsic electric properties of the cylinder to be measured (here especially the capacitive property of the cylinder) and detects the changes in these properties during the linear expansion of the cylinder. A fluidic cylinder behaves like a capacitor, wherein the cylinder and the piston rod act as electrodes of a cylindrical capacitor, whereas the plastic seal on the piston and on the cylinder cover as well as the fluid, in particular the hydraulic oil, act as a dielectric. In the case of a linear expansion of the fluidic cylinder, the intrinsic capacitance of the fluidic cylinder is changed as a result of the change in the capacitor surface. In accordance with the present disclosure, the linear expansion of the fluidic cylinder therefore can be determined by measuring this intrinsic capacitance.

In one example, it is advantageous that neither the measuring element nor the measuring electronics are mounted inside the cylinder and hence no constructive changes must be made in the fluidic cylinder. Accordingly, this is a very inexpensive and yet robust measuring method.

Advantageously, the evaluation unit determines the intrinsic capacitance of the fluidic cylinder via an oscillator circuit with frequency evaluation, wherein the frequency evaluation advantageously is effected digitally. The oscillator circuit can be an LC circuit, an RC circuit or also other types of oscillator, such as a Martin or modified Martin oscillator, in which the fluidic cylinder is used as a capacitor. The capacitance can be determined with a suitable frequency, e.g. 100 kHz, and a suitable voltage level via a digital frequency evaluation.

Alternatively, the evaluation unit determines the capacitance via an AC voltage measurement bridge or an AC voltage measurement amplifier with voltage evaluation, wherein advantageously a digital frequency evaluation is effected.

Furthermore, evaluation can be effected by a circuit with switched-capacitor technique with voltage evaluation, in which the cylinder is charged to a reference voltage with a constant frequency and is discharged by an integrator.

In a first variant of the present disclosure, the evaluation unit calculates the position of the piston rod as a linear function of the capacitance measured. It was found out that in a relatively good approximation the capacitance represents a linear function of the travel of the piston rod and vice versa. Due to the linear approximation, an extremely simple evaluation method is obtained, which nevertheless provides for determining the position of the piston rod with respect to the cylinder with sufficient accuracy.

Advantageously, however, the evaluation unit calculates the position of the piston rod with reference to a stored characteristic map as a function of the capacitance measured. It was found out that in particular in the middle region of the cylinder stroke the properly approximated capacitance represents a linear function of the travel of the piston rod and vice versa. At the beginning and at the end of the cylinder stroke, however, the capacitance represents a non-linear function of the travel. By means of a characteristic map stored in the evaluation electronics, a precise calibration is achieved for the entire stroke length. In this way, a determination of the position of the piston rod with respect to the cylinder can be realized with greater accuracy.

Advantageously, the evaluation unit furthermore comprises a temperature compensation. In this way, an adulteration of the measurement results by temperature fluctuations can be prevented.

Furthermore, advantageously, the evaluation unit additionally measures the conductivity of the cylinder. The conductivity of the fluidic cylinder advantageously is measured between the piston rod and the cylinder jacket. In this way, a check of the operability of the cylinder and/or a compensation of the measurement results can be implemented.

The parallel conductivity of the fluidic cylinders as a result of the contaminations present inside the fluid circuit, in particular of the metal particles, but also of the external environmental contaminations, influences the results of the capacitance measurement. Advantageously, the evaluation unit therefore additionally measures the conductivity of the cylinder and compensates the errors in the capacitance measurement results caused by the conductivity.

Advantageously, the evaluation unit includes a function for detecting sealing errors. By measuring the intrinsic capacitance and/or the conductivity of the fluidic cylinder of the present disclosure, the evaluation unit can detect sealing errors and for instance send a warning signal to the central machine control.

Furthermore advantageously, the evaluation unit includes a function for detecting the fluid condition. Here as well, the condition of the fluid used, in particular the condition of the hydraulic oil, can be inferred by measuring the intrinsic capacitance and/or the conductivity. Accordingly, the measuring method of the present disclosure can indicate a deterioration of the fluid or oil quality in due time.

Accordingly, the position measuring device of the present disclosure can monitor the operability of the cylinder and detect damages of the cylinder gaskets and the deterioration of the oil quality.

Advantageously, the evaluation unit includes a memory in which the intrinsic capacitance of the capacitor formed by cylinder jacket and piston rod is storable and/or stored for the two end positions of the piston rod. By comparing the stored values with the currently measured values at these firm positions, the operability of the cylinder and/or of the position measuring device can be monitored.

Advantageously, the fluidic cylinder, whose linear expansion is measured by the position measuring device of the present disclosure, is pivotally mounted on a machine construction on at least one side via an electric insulator. It thereby is prevented that the fluidic cylinder pivotally mounted on a machine construction is short-circuited by the same, which would prevent a position measurement. Therefore, the fluidic cylinder of the present disclosure is electrically insulated against the metallic machine construction. Advantageously, it is pivotally mounted on the machine construction on both sides via an electric insulator. Advantageously, the pivotal attachment is effected via an electrically insulated sliding ring, such as a plastic sliding ring or a ceramic sliding ring. Such sliding rings have a high mechanical strength and a high electrical resistance at the same time.

To eliminate the influence of the parasitic capacitances, an active potential equalization surface advantageously is used, which has the same electric potential as the cylinder. This structure leads to an optimum shielding of disturbing fields.

The fluidic cylinder, for which the position measuring device of the present disclosure is used, advantageously includes electric terminals for connecting the evaluation unit with the cylinder jacket and the piston rod. These are the only structural changes to be made for implementing the present disclosure in a commercially available fluidic cylinder. There is provided a first electric terminal electrically connected with the cylinder jacket and a second electric terminal electrically connected with the piston rod. To these two electric terminals, the evaluation unit is connected, which can be configured for instance as an external device.

In a first aspect of the present disclosure, the electric terminal for the piston rod is arranged in the vicinity of the pivotal attachment of the piston rod and firmly connected with the same. In this way, a particularly simple mechanical solution is obtained, wherein the two terminals are, however, moved against each other in the case of a linear expansion of the fluidic cylinder.

Alternatively, the electric connection for the piston rod therefore is effected via a sliding contact. The slide carrier advantageously is arranged on the cylinder jacket or on the cylinder cover and is connected with the piston rod via a sliding contact. Furthermore, the slide carrier can be mounted outside the cylinder.

In a further embodiment, the evaluation unit is firmly mounted on one side of the cylinder, while the measurement signals are sent to the machine control by wireless transmission. The evaluation unit is directly mounted on one side of the fluidic cylinder and electrically connected with the cylinder. The other terminal is connected with the cylinder by the metallic machine construction. The power supply for the evaluation unit advantageously is effected by a battery incorporated in the evaluation unit. The output signal of the evaluation unit is sent to the machine control by wireless transmission, e.g. by radio. For transmitting the measurement signal, e.g. the frequency band of 433 MHz or other frequency bands (such as WLAN, Bluetooth, . . . ) can be utilized. In particular in the field of construction machines, in which the cablings can be damaged by falling stones, this configuration offers considerable advantages. In particular, the reliability of the measuring device is increased and the implementation costs are reduced.

The present disclosure furthermore comprises a fluidic cylinder for a position measuring device according to any of the preceding claims. In particular, the cylinder is a hydraulic or pneumatic cylinder. In particular, this fluidic cylinder includes electric terminals for connecting the evaluation unit with the cylinder jacket and the piston rod. Furthermore, insulators advantageously are provided for pivotal attachment of the fluidic cylinder to a machine construction.

The present disclosure furthermore comprises an evaluation unit for a position measuring device as described above. The same comprises the necessary measurement and evaluation electronics for measuring the capacitance and for calculating the linear expansion of the fluidic cylinder.

The present disclosure furthermore comprises an apparatus, in particular a machine, a vehicle, an aircraft and/or a working machine, with a fluidic cylinder and a position measuring device as described above. The present disclosure can be used in a multitude of different fields of application, in order to determine the linear expansion of a fluidic cylinder. In particular, it can be used in construction machines such as e.g. hydraulic excavators, crawler excavators or wheel loaders. Furthermore, the use in cranes is also possible. In addition, there are applications in the field of aviation engineering, production engineering (e.g. steel rolls, hydraulic press), packaging machines, food production, plastics machines, in the automotive industry (passenger cars, trucks, agricultural machines), in testing machines and in all other applications in which the linear expansion of a fluidic cylinder should be determined with little constructive effort.

Advantageously, the fluidic cylinder is moved with reference to the data determined by the position measuring device by supplying the same with pressurized fluid and thus is positioned precisely. The fluidic cylinder thus is a working cylinder, which serves to move an element of the apparatus, for which purpose it is supplied with pressurized fluid by a control unit. The position measuring device of the present disclosure provides data to the control unit, by means of which data the movement of the cylinder can be controlled. The data of the position measuring device likewise can be utilized to detect undesired changes in length of the cylinder due to malfunctions and/or provide for an automatic actuation of the cylinder.

The present disclosure furthermore comprises a method for determining the position of the piston rod of a fluidic cylinder with respect to the cylinder jacket, in which the intrinsic capacitance of the capacitor formed by cylinder jacket and piston rod is measured and the position of the piston rod is calculated from the capacitance measured. Advantageously, the capacitance is measured via an oscillator circuit, furthermore advantageously by means of a frequency evaluation. The position of the piston rod advantageously is determined as a linear function of the capacitance measured. Furthermore advantageously, the conductivity of the cylinder is measured and by means of the conductivity measured the operability of the fluidic cylinder furthermore is monitored. In particular, sealing errors and/or the fluid condition, in particular the oil condition of hydraulic cylinders is detected on the basis of the conductivity measured. Advantageously, the measured position of the piston rod with respect to the cylinder jacket is supplied to a control unit of an apparatus. With reference to these data, the same can supply the cylinder with pressurized fluid. The actuation of the cylinder thus is effected with reference to the data of the position measuring device. Furthermore, the data can be utilized for automating movements and/or as a safety function for monitoring undesired changes in length of the cylinder due to cylinder malfunctions.

BRIEF DESCRIPTION OF FIGURES

The present disclosure will now be explained in detail with reference to embodiments and drawings, in which:

FIG. 1*a*: shows a sectional view through a first embodiment of a fluidic cylinder in accordance with the present disclosure, FIG. 1*b*: shows a sectional view through a second embodiment of a fluidic cylinder in accordance with the present disclosure, FIG. 1*c*: shows a sectional view through a third embodiment of a fluidic cylinder in accordance with the present disclosure.

DETAILED DESCRIPTION

Figure 1D:
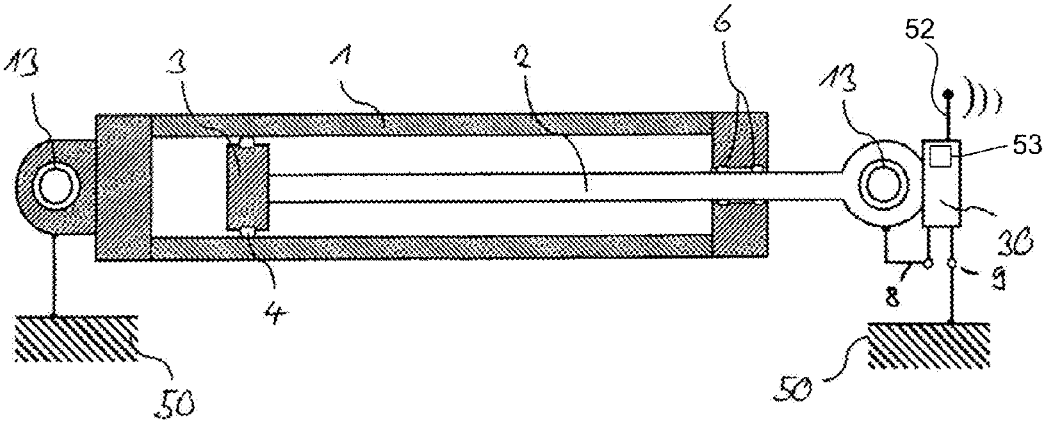
FIG. 1*d*: shows a sectional view through a fourth embodiment of a fluidic cylinder in accordance with the present disclosure with a cylinder-mounted evaluation unit with wireless signal transmission.
Figure 1E:
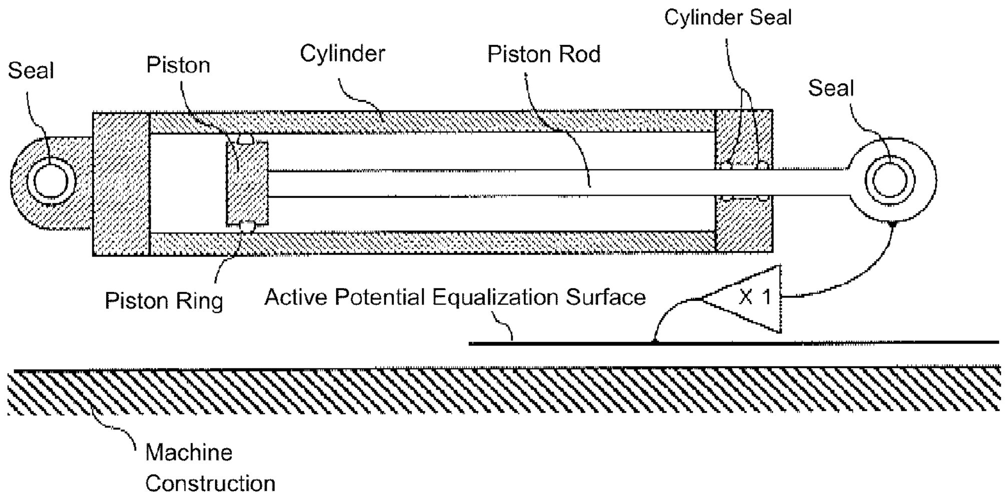
FIG. 1*e*: shows a sectional view through a fifth embodiment of a fluidic cylinder that shows an active potential equalization surface.

FIGS. 1*a* to 1*e* show five embodiments of a fluidic cylinder in accordance with the present disclosure. Like all fluidic cylinders, the same includes a cylinder jacket 1 and a piston rod 2 movably guided therein in longitudinal direction, on which a piston 3 is arranged. This provides a piston space 11 and a cylinder space 12, which for moving the piston are supplied with a fluid, in particular with hydraulic oil or compressed air. The cylinder jacket 1 and the piston rod 2 are made of metal, in particular of steel or of metal-coated materials, and thus form the electrodes of a cylindrical capacitor. The plastic seal 4 between piston 3 and cylinder jacket 1 and the plastic seal 6 between piston rod 2 and cylinder cover 5 as well as the dielectric fluid in the chambers 11 and 12 serve as a dielectric. A linear expansion of the fluidic cylinder due to a movement of the piston rod 2 relative to the cylinder jacket 1 now changes this intrinsic capacitance of the fluidic cylinder due to a change in the capacitor surface. The electrically non-conducting sliding rings 13 electrically insulate the cylinder against the metallic machine construction.

The cylinder is a working cylinder which moves an element of a working machine 51 and whose movement is actuated by a machine control 40. For this purpose, the machine control 40 controls the fluid flow to the two chambers 11 and 12 of the cylinder, for example, by controlling a supply of pressurized hydraulic fluid to control extension of the piston rod based on the measured position via the capacitance. Alternatively, the working machine 51 may represent various devices as noted herein, including a vehicle, aircraft and/or other machine, such as hydraulic excavators, crawler excavators, wheel loaders, cranes, and/or other machines having a boom or dipper arm moved by the working cylinder.

In accordance with the present disclosure, the linear expansion of the fluidic cylinder now is determined by measuring this intrinsic capacitance of the fluidic cylinder of the present disclosure. For this purpose, electric terminals 8 and 9 are provided for connecting the cylinder jacket 1 and the piston rod 2 with an evaluation unit 30. The terminals 8 and 9 each are electrically connected with the cylinder jacket 1 and the cylinder rod 2, respectively. The evaluation unit 30 then supplies the measurement results to the machine control 40, where the measurement results are employed for actuating and/or monitoring the cylinder.

FIG. 1*a* shows a first embodiment, in which the terminal 8 for connecting the evaluation unit with the piston rod 2 is arranged in the vicinity of the mounting lug 7 on the piston rod 2. In FIG. 1*b*, however, a second embodiment is shown, in which a sliding contact 10 is used for electrically contacting the piston rod 2. In this embodiment, the sliding contact 10 is arranged on the cylinder cover 5 of the fluidic cylinder and makes the contact with the piston rod 2. In FIG. 1*b*, the sliding contact 10 is arranged inside the cylinder space 12. Alternatively, as shown in FIG. 1*c*, the sliding contact 10 might also be arranged outside the cylinder space 12, e.g. on the outside of the cylinder cover or integrated in the cylinder cover.

In FIG. 1*c*, a fourth embodiment is shown, in which the evaluation unit 30 is directly mounted on one side of the fluidic cylinder and electrically connected to the cylinder. The other terminal 9 of the evaluation unit 30 is connected with the cylinder by the metallic machine construction 50, which may be a component of the machine 50, such as a machine frame, etc. The power supply for the evaluation unit is effected by a battery 53 incorporated in the evaluation unit. Wireless and by radio, the output signal of the evaluation unit is transmitted to a machine control unit by means of an antenna 52 integrated in the evaluation unit.

An advantage of the measuring method of the present disclosure consists in that the fluidic cylinder itself serves as a measuring element and accordingly no additional measuring element must be provided. Moreover, no measuring electronics must be arranged in the cylinder. Accordingly, no structural changes of the fluidic cylinder are required, except for the arrangement of the two electric terminals.

Figure 2:
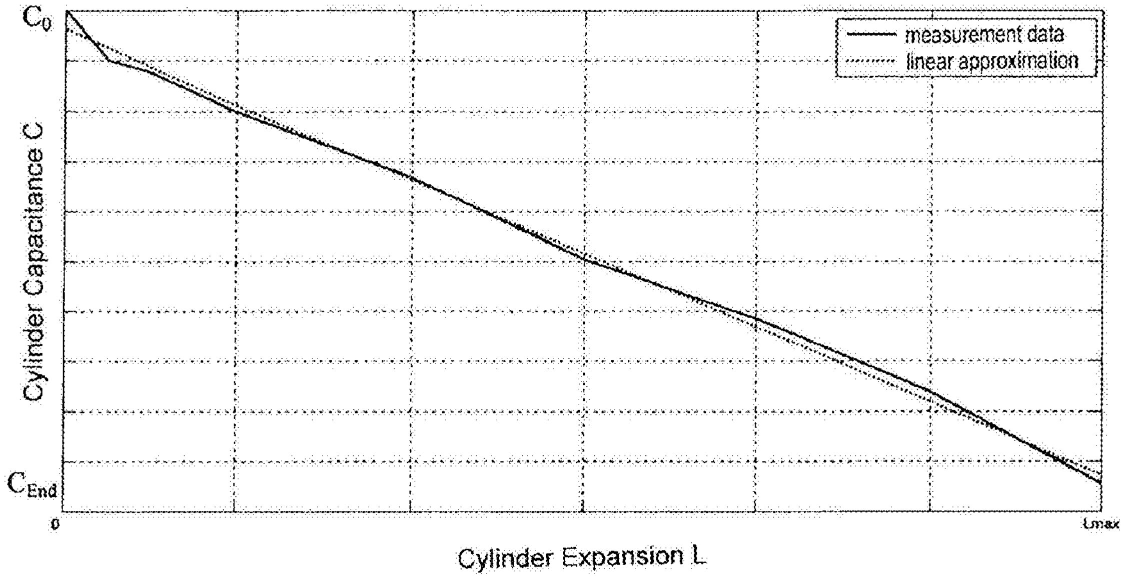
FIG. 2: shows a diagram which represents the intrinsic capacitance of a fluidic cylinder in dependence on the travel and its linear approximation.

In the case of a linear expansion of the fluidic cylinder, its intrinsic capacitance is changed, since the capacitor surface of the cylindrical capacitor formed by cylinder jacket 1 and piston rod 2 is changed. This change in capacitance is measured and evaluated by means of the evaluation unit of the present disclosure. The dependence of the cylinder capacitance on the linear expansion is shown in FIG. 2. In a very good approximation, the measurement curve corresponds to a linear dependence between capacitance and travel.

In a first variant of the present disclosure, the travel and the position of the piston rod correspondingly are determined as a linear function of the capacitance. Accordingly, this is a very inexpensive and robust measuring device for determining the linear expansion of the fluidic cylinder, which nevertheless provides a sufficient measurement accuracy.

However, since especially at the ends of the stroke of the cylinder deviations from the linear relation exist, a characteristic map is stored in the evaluation unit in accordance with an alternative embodiment of the present disclosure, by means of which the position of the cylinder rod can be determined with reference to the capacitance. Especially in the edge portions, an even more precise measurement and actuation thus are obtained. Due to the use of a characteristic map, implementation nevertheless remains simple and robust.

The evaluation unit comprises an evaluation electronics, which determines the capacitance e.g. by means of a component 15, such as an oscillator circuit (LC, RC or Martin oscillator or modified Martin oscillator) with a suitable frequency and a suitable voltage level by digital frequency evaluation. The calculation of the travel from the capacitance then is effected as described above by means of the stored characteristic map. Furthermore, a temperature compensation is provided. Furthermore, the evaluation can be realized by an AC voltage measurement bridge or by an AC voltage measurement amplifier, in which the cylinder is connected as a variable capacitor in the coupling or feedback path, also represented by component 15.

Component 15 may also represent a circuit, where evaluation also can be effected by the circuit with switched-capacitor technique, in which the cylinder is charged to a reference voltage with a constant frequency and is discharged by an integrator. At the output, a DC voltage is obtained, which is proportional to the cylinder capacitance.

The evaluation unit furthermore includes a function for monitoring the operability of the cylinder. Damages of the cylinder gaskets and a deterioration of the fluid quality can be detected and indicated in due time by measuring the conductivity of the cylinder.

To prevent short-circuiting of the fluidic cylinder by a metallic machine construction, the pivotal attachment of the fluidic cylinder to the metallic machine construction must be electrically insulating. This can be realized by using electrically insulating sliding rings 13 for supporting the fluidic cylinders. Such sliding rings have a high mechanical stability and a high electric resistance. There can be used for instance insulating gaskets (made of pure plastics without graphite or metal particles).

Figure 3:
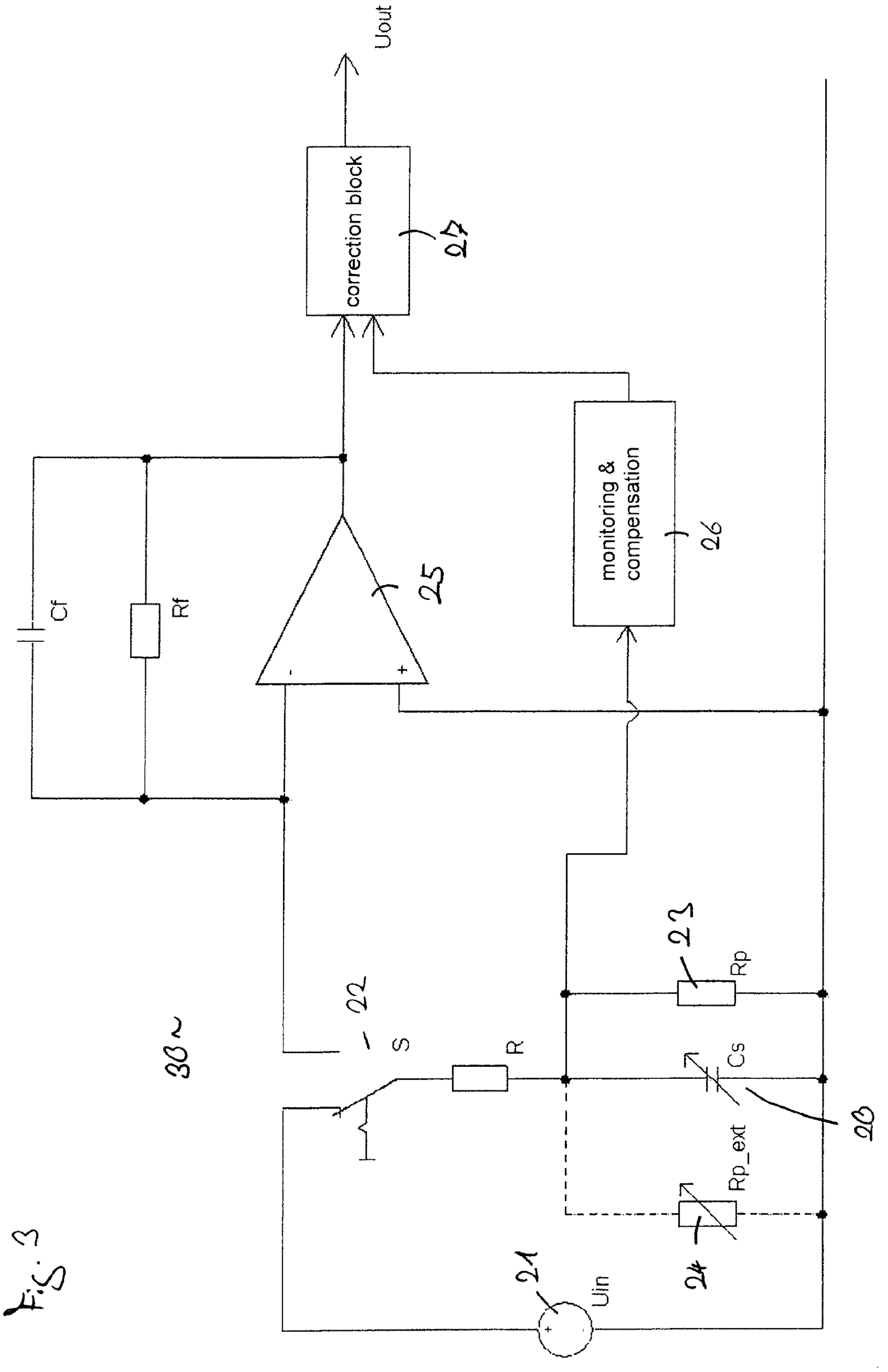
FIG. 3: shows a circuit diagram of a capacitance measuring arrangement of an embodiment of an evaluation unit in accordance with the present disclosure.

FIG. 3 shows a circuit diagram of a capacitance measuring arrangement of an embodiment of an evaluation unit in accordance with the present disclosure, in which the intrinsic capacitance Cs of the fluidic cylinder 20 is evaluated by means of a switched-capacitor technique. The cylinder 20 is charged to a reference voltage Uin via the voltage source 21 with constant frequency. By switching with the switch 22, the cylinder 20 then is discharged via the integrator 25. At the output of the integrator, a DC voltage is obtained, which is proportional to the cylinder capacitance. There was provided a low-resistance parallel resistor 23 to the cylinder 20, which makes the circuit less sensitive to changes in conductivity of the cylinder.

The changes in conductivity are schematically represented by the variable resistor 24. There is provided a block 26 for monitoring and/or compensation, in which the variable resistance of the cylinder is determined. The block 26 monitors the cylinder function and detects sealing errors. In addition, it calculates the influence of external conductivities, e.g. by external contaminations, on the capacitance measurement with reference to the parallel resistance determined. In the correction block 27, measurement errors with respect to the capacitance are corrected, which are based on the changes in conductivity of the cylinder 20. The output voltage Uout hence corresponds to the corrected capacitance of the cylinder 20.

The capacitance measured is evaluated in accordance with the present disclosure, in order to determine the linear expansion of the cylinder. Advantageously, a characteristic map is stored in the evaluation unit, which serves to compensate the partly non-linear behavior of the cylinder capacitance. In addition, the cylinder capacitance for the end and starting positions of the cylinder advantageously can be stored for an automatic calibration of the measurement.

In accordance with the present disclosure, the measurement data on the linear expansion of the cylinder are transferred to a machine control of a working machine, where they can be used for actuating the cylinder. An automation of the actuation of the cylinder can be effected via the measurement signals. Alternatively or in addition, the data of the position measuring device of the present disclosure can be utilized for monitoring the cylinders for undesired changes in length due to malfunctions. For this purpose, the position measuring device supplies its data to a safety means for monitoring the working machine. Furthermore, data of the sealing error and/or oil condition detection can be supplied to the machine control. In particular, these data are supplied to an information system, in particular to an operator information system and/or a maintenance management system of the working machine.

Beside the use in construction machines, in particular for determining the length of the hydraulic cylinders used for moving the boom or dipper arm, a multitude of further applications are obtained for the position measuring device of the present disclosure. There is provided a measuring system which offers an excellent solution in terms of costs, construction and accuracy.

The invention claimed is:

1. A position measuring device for a fluidic cylinder which includes an outermost cylinder jacket and a piston rod longitudinally movable in the cylinder jacket, the position measuring device comprising an evaluation unit which determines the position of the piston rod with respect to the cylinder jacket with reference to an intrinsic capacitance of a capacitor having the cylinder jacket and the piston rod as electrodes and a dielectric fluid acting as a dielectric, each of the piston rod and a piston arranged on the piston rod separated from the cylinder jacket by a plastic seal, the plastic seal also acting as a dielectric.

2. The position measuring device according to claim 1, wherein the evaluation unit determines the capacitance via an oscillator circuit with frequency evaluation, wherein the frequency evaluation is effected digitally or wherein the evaluation unit determines the capacitance via an AC voltage measurement bridge or an AC voltage measurement amplifier with voltage evaluation, wherein a digital frequency evaluation is effected.

3. The position measuring device according to claim 1, wherein the evaluation unit determines the capacitance via a circuit with a switched-capacitor system, measures a conductivity of the cylinder, and corrects for an influence of the conductivity of the cylinder on the determined capacitance, and wherein a resistor in parallel with the cylinder makes the circuit less sensitive to changes in the conductivity of the cylinder.

4. The position measuring device according to claim 1, wherein the evaluation unit calculates the position of the piston rod with reference to a stored characteristic map as a function of the capacitance measured.

5. The position measuring device according to claim 1, wherein the evaluation unit comprises a temperature compensation.

6. The position measuring device according to claim 3, wherein the evaluation unit includes a function for detecting sealing errors and/or a function for detecting an oil condition.

7. The position measuring device according to claim 1, wherein the evaluation unit comprises a memory in which the intrinsic capacitance of the capacitor formed by cylinder jacket and piston rod is storable and/or stored for two end positions of the piston rod.

8. The position measuring device according to claim 1, wherein the fluidic cylinder is pivotally attached on at least one side to a machine construction via an electric insulator.

9. The position measuring device according to claim 8, wherein the at least one side is pivotally attached to the machine construction via the electric insulator via a plastic sliding ring, ceramic and/or ceramic-coated sliding ring.

10. The position measuring device according to claim 1, further comprising an active potential equalization surface which has an electric potential that is the same as an electric potential of the cylinder.

11. The position measuring device according to claim 9, wherein the fluidic cylinder includes electric terminals connecting the evaluation unit with the cylinder jacket and the piston rod, respectively, wherein the electric terminal for the piston rod is arranged in a vicinity of the pivotal attachment of the piston rod and is firmly connected with the piston rod or the electric terminal for the piston rod is effected via a sliding contact.

12. The position measuring device according to claim 1, wherein the evaluation unit is firmly mounted on one side of the cylinder and sends measurement signals to a machine control by wireless transmission, wherein the evaluation unit includes an incorporated energy supply.

13. The position measuring device according to claim 12, wherein the incorporated energy supply is a battery and/or an integrated antenna.

14. The position measuring device according to claim 1, wherein the fluidic cylinder is coupled in a machine, vehicle, aircraft and/or working machine, and where the evaluation unit is coupled to the piston rod and cylinder jacket via a first and second electrode, respectively, where neither the evaluation unit nor the measuring electrodes are mounted inside the fluidic cylinder, and wherein the dielectric includes hydraulic oil.

15. The position measuring device according to claim 14, wherein the fluidic cylinder is moved and precisely positioned with reference to data determined by the position measuring device by supplying the position measuring device with pressurized fluid.

16. The position measuring device according to claim 1, wherein the fluidic cylinder is coupled in a working machine, and wherein the evaluation unit is further coupled in the working machine, and where the evaluation unit is coupled to an exterior of the cylinder jacket and wherein the evaluation unit is further coupled to the piston rod at a location exterior to the cylinder jacket, wherein the piston rod is partially enclosed within the cylinder jacket, and wherein the dielectric includes hydraulic fluid.

17. A method of measuring position of a fluidic cylinder which includes an outermost cylinder jacket and a piston rod longitudinally movable in the cylinder jacket, comprising:

determining the position of the piston rod with respect to the cylinder jacket in response to an intrinsic capacitance of a capacitor formed by the cylinder jacket, the piston rod and a dielectric fluid, the cylinder jacket and piston rod representing electrodes of the capacitor, and the dielectric fluid between the cylinder jacket and the piston rod acting as a dielectric of the capacitor.

18. The method of claim 17, further comprising:

compensating a measured capacitance of the capacitor based on temperature to determine the position, measuring a conductivity between the piston rod and the cylinder jacket;

compensating for an influence of the cylinder conductivity on the determined position; and indicating degradation of the fluidic cylinder based on the conductivity.

19. The method of claim 18, wherein the degradation includes a sealing degradation and/or a degradation of an oil condition, and wherein the fluidic cylinder is mounted in a working machine, the method further comprising adjusting an operating condition of the working machine to control extension of the cylinder in response to the determined position, where extension of the cylinder is controlled by supplying the cylinder with pressurized fluid.

20. A position measuring device for a fluidic cylinder which includes an outermost cylinder jacket and a piston rod longitudinally movable in the cylinder jacket, the position measuring device comprising an evaluation unit which determines the position of the piston rod with respect to the cylinder jacket with reference to an intrinsic capacitance of a capacitor, the cylinder jacket and the piston rod acting as electrodes of the capacitor and a dielectric fluid acting as a dielectric of the capacitor, wherein a plastic seal between a piston arranged on the piston rod and the cylinder jacket and a plastic seal between the piston rod and the cylinder jacket also serve as the dielectric, and wherein the fluidic cylinder itself serves as a measuring element.

* * * * *